(12) United States Patent
Johnston et al.

(10) Patent No.: US 6,428,013 B1
(45) Date of Patent: Aug. 6, 2002

(54) REVERSE SEAL

(75) Inventors: David E. Johnston, East Hebron, NH (US); Milton Griswold, Cleveland, GA (US); David Sakata, Livonia, MI (US)

(73) Assignee: Freudenberg-Nok General Partnership, Plymouth, MI (US)

( * ) Notice: Subject to any disclaimer, the term of this patent is extended or adjusted under 35 U.S.C. 154(b) by 0 days.

(21) Appl. No.: 09/494,050

(22) Filed: Jan. 28, 2000

Related U.S. Application Data
(60) Provisional application No. 60/117,723, filed on Jan. 29, 1999.

(51) Int. Cl.[7] .................................................. F16J 15/34
(52) U.S. Cl. ........................ 277/400; 277/429; 277/430; 277/559
(58) Field of Search ................... 277/351, 353, 277/399, 400, 394, 424, 429, 430, 549, 559, 561, 563, 572

(56) References Cited

U.S. PATENT DOCUMENTS

| | | | |
|---|---|---|---|
| 3,929,341 A | * | 12/1975 | Clark |
| 4,106,781 A | | 8/1978 | Benjamin et al. |
| 4,132,421 A | | 1/1979 | Corsi et al. |
| 4,383,691 A | | 5/1983 | Potter |
| 4,522,411 A | | 6/1985 | Burgan |
| 4,531,748 A | | 7/1985 | Jackowski |
| 5,083,802 A | | 1/1992 | Shimasaki et al. |
| 5,149,106 A | | 9/1992 | Takenaka et al. |
| 5,183,271 A | * | 2/1993 | Wada et al. |
| 5,462,287 A | | 10/1995 | Hering et al. |
| 5,692,757 A | * | 12/1997 | Straub |
| 5,758,881 A | | 6/1998 | Stanley |
| 6,102,409 A | * | 8/2000 | Furuyama et al. |

* cited by examiner

Primary Examiner—Robert J. Sandy
Assistant Examiner—Karlena D Schwing
(74) Attorney, Agent, or Firm—A. Michael Tucker; Casimir R. Kiczek

(57) ABSTRACT

An improved dual lip radial shaft seal is disclosed. The free end of the dual lip seal extends toward the air side of the seal. Optionally, the dual lip seal has an oil side excluder lip seal, an air side dust excluder lip seal, an elastomeric static seal extending from the elastomeric portion of the dual lip seal. In another optional embodiment, a relief groove is formed in the seal. A unitized seal version is also disclosed with two embodiments.

11 Claims, 8 Drawing Sheets

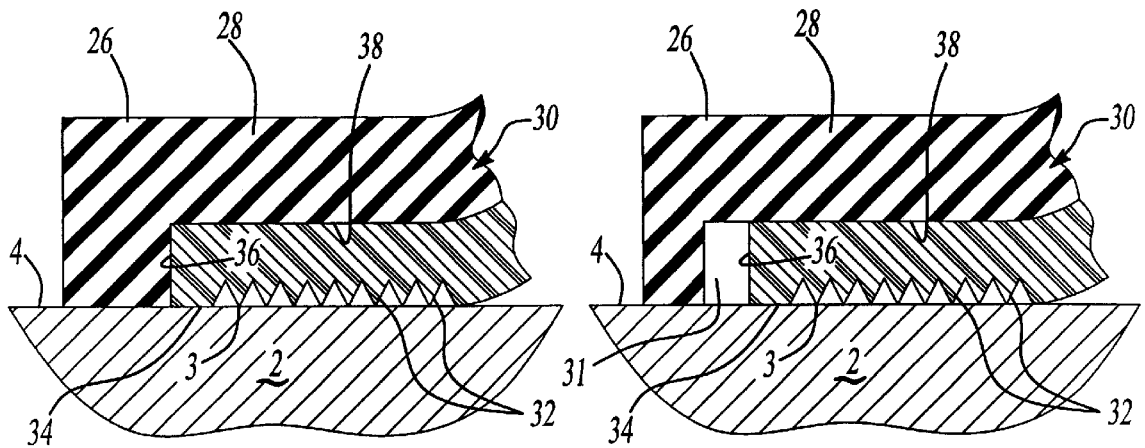
Fig-4
Fig-5
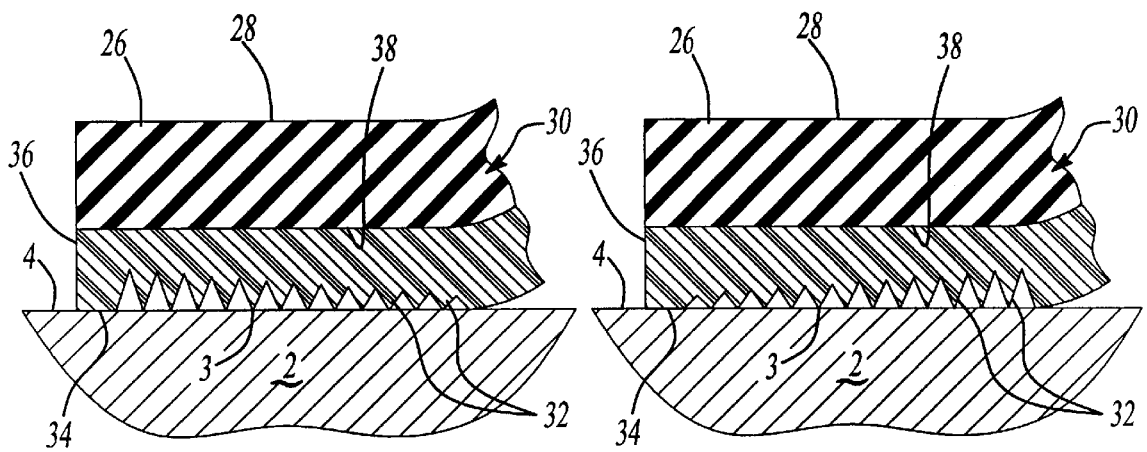
Fig-6
Fig-7

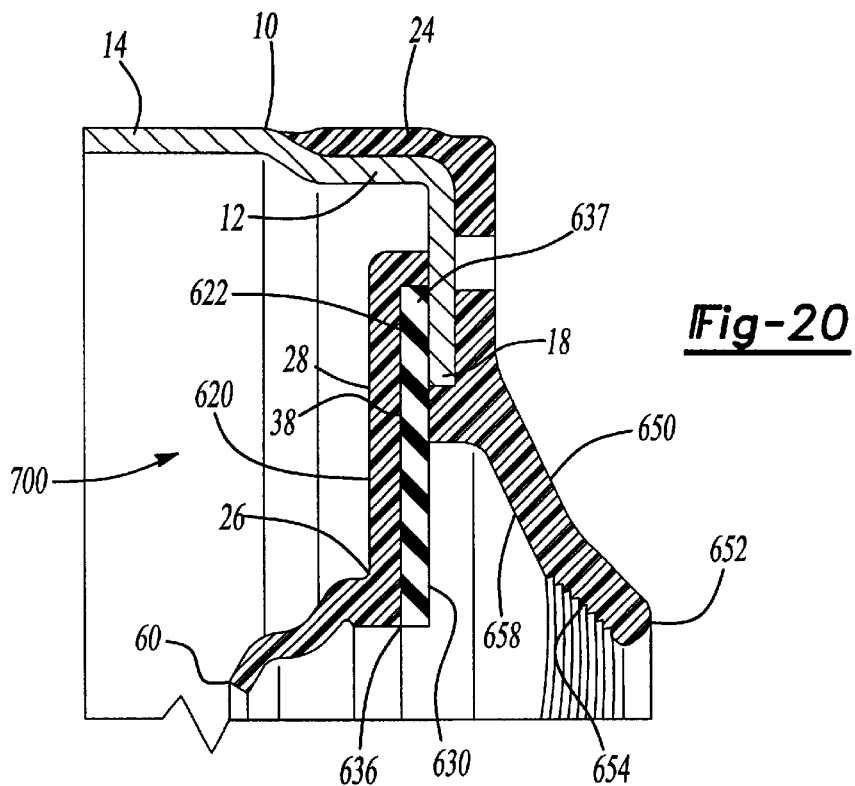
*Fig-20*
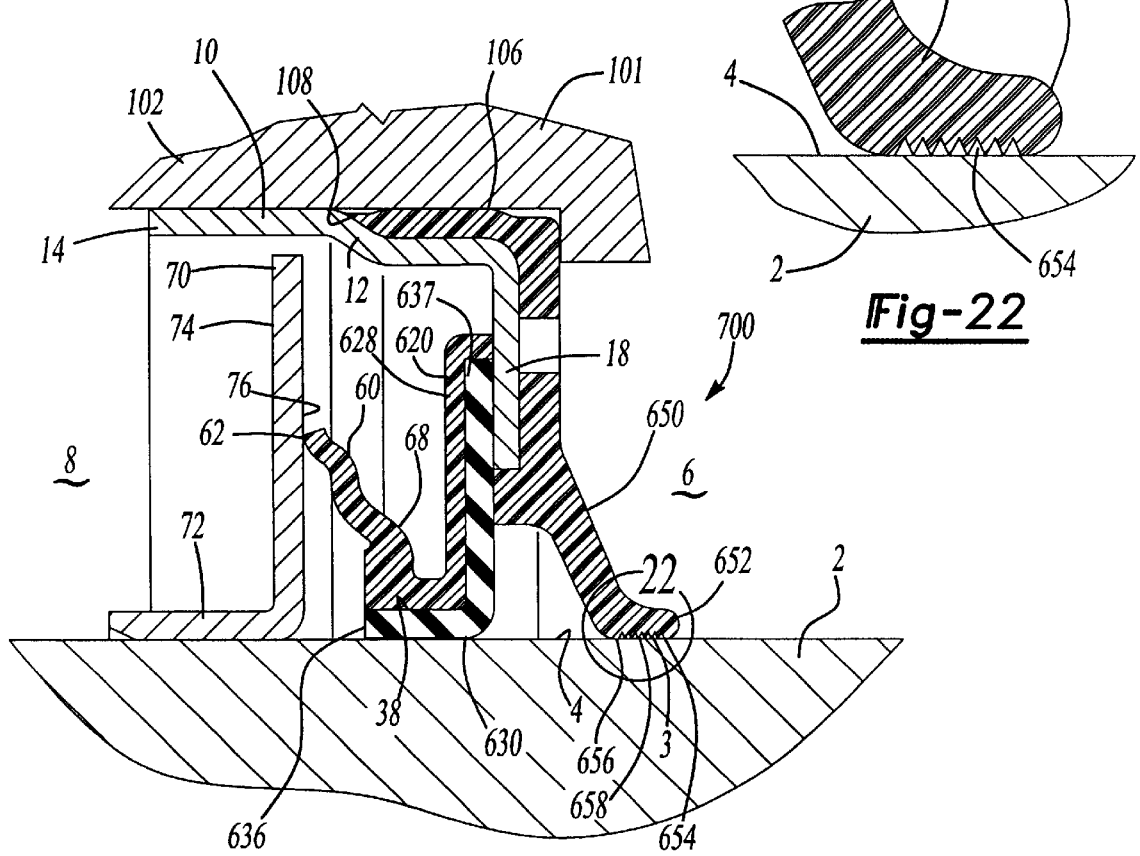
*Fig-22*
*Fig-21*

REVERSE SEAL

CROSS REFERENCE TO RELATED APPLICATION

This application claims priority from U.S. patent application Ser. No. 60/117,723, filed Jan. 29, 1999.

BACKGROUND OF THE INVENTION

This invention relates in general to fluid seals for use in sealing a rotating shaft member. More particularly, the invention relates to an improved radial lip shaft seal of the type having an elastomeric body bonded to a metal case in which the contacting surface of the lip is made of polytetrafluoroethylene, and an apparatus for incorporating the radial lip shaft seal into unitized seals.

There are already in existence various types of radial lip seals, some of which use polytetrafluoroethylene (PTFE) for at least one of the lips. However, all of the known designs where the PTFE lip is the primary lip sealing the oil, have the free end of the radial lip facing the oil side of the sealed region. This makes it very difficult to install onto circular shafts, necessitating the use of special fixtures and special assembly precautions to assemble such seals on shafts so as not to nick or damage the surface of the PTFE material and destroy the functionality of the seals. This is because fluoroplastic materials are very susceptible to nicking or other surface damage to the contacting surface which compromises their ability to seal effectively.

A seal failure is critical in modern seal mechanisms even though the seal itself may be substantially less expensive than most other system components. However, the damage potential in event of seal failure is large, especially where the seal is located in an inaccessible location as is common in many modern compact and complex machines.

There has also been found a need for so-called unitized seals, that is, seals which incorporate both the seal and the counter wear surfaces, commonly known as the wear sleeve. The seal and the wear sleeve components are combined into a single assembly or "unitized". By pre-assembling these components together, proper dimensional installation is achieved, protection against nicking or other damage during handling is avoided, prelubrication, if desired, may be insured, and correct dimensional tolerances may be controlled at the point where the seal is manufactured as opposed to the point at which the other parts are manufactured or assembled.

None of the prior art patents teach a PTFE primary lip seal which does not require special fixtures and/or special assembly precautions to prevent damage to the seal surface and which provide a solution to this problem.

These and other objects and features of the invention will become apparent from the description and especially taken in conjunction with the accompanying drawings illustrating the invention.

BRIEF DESCRIPTION OF THE DRAWINGS

The various advantages of the present invention will become apparent to one skilled in the art upon reading the following specification and by reference to the drawings which include:

FIG. 4 is an enlarged view of a first optional embodiment of the end facing the air side of the composite body of the seal ring in circle 3 of FIG. 2;

FIG. 5 is an enlarged view of a second optional embodiment of the end facing the air side of the composite body of the seal ring in circle 3 of FIG. 2;

FIG. 6 is an enlarged view of a third optional embodiment of the seal ring in circle 3 of FIG. 2;

FIG. 7 is an enlarged view of a fourth optional embodiment of the end facing the air side of the composite body of the seal ring in circle 3 of FIG. 2;

FIG. 20 is a partial cross-sectional view of the fourth alternate embodiment of the seal composite body;

FIG. 21 is a partial cross-sectional view of the fourth alternate embodiment of the seal on a shaft; and FIG. 22 is an enlarged view of the helices on the oil excluder lip of the fourth alternate embodiment of the invention in Circle 22 of FIG. 21.

DETAILED DESCRIPTION OF THE PREFERRED EMBODIMENT

The seal according to the present invention has a seal band on the principal seal element which is in fluid tight sealing contact with a wear surface on a circular shaft or similar surface. The wear surface is disposed radially inwardly of the principal seal element. The invention applies equally to seals wherein these elements are reversed, that is, the sealing element is urged radially outward against a seal wear surface which is disposed radially outward of the principal seal element. It will also be understood that the invention applies equally to seals with unitizing elements wherein the wear sleeve element is located on a circular shaft or a surface disposed radially inward of the principal seal element or wherein the elements are reversed, that is, with the seal band of the primary seal element urged radially outward against a flange or a unitizing element which is disposed radially outward of it.

Figures 1, 2, 3:
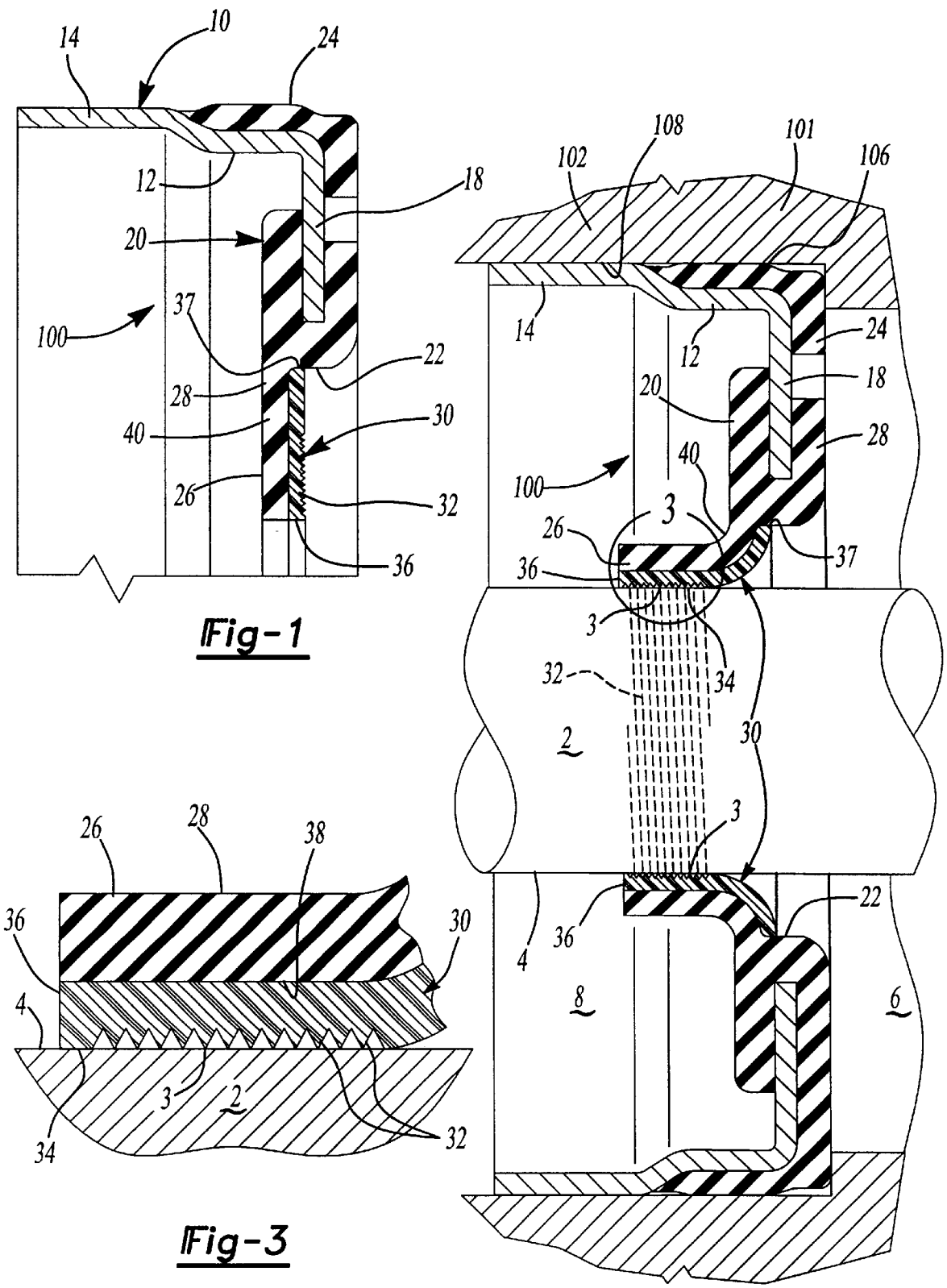
FIG. 1 is a partial cross-sectional view of the preferred embodiment of the composite seal ring according to the present invention.
FIG. 2 is a partial cross-sectional view of the preferred embodiment of the composite seal ring installed on a shaft.
FIG. 3 is an enlarged view of the preferred embodiment composite seal ring in circle 3 of FIG. 2.

Referring now to the drawings, FIG. 1 shows the preferred embodiment of the shaft seal 100 assembly made according to the invention as molded, that is, as the seal 100 is formed and it is removed from a molding press. The elastomeric seal 100 is molded either by compression, transfer, or injection molding or a combination of these processes or similar processes.

The seal 100 includes a rigid case 10 and an elastomeric seal body generally designated 20 molded to the case 10. The seal body 20 includes a bonding portion 22, a static seal portion 24 formed in an offset portion 14 of the case 10, a primary or principal seal ring 30 and an intermediate or connecting body portion 28 lying between a perpendicular leg portion 18 on the case 10 and the peripheral seal ring 30. The case 10 may be a radial retainer or preferably an L-shaped case which has a first longitudinal extending portion 12, a second longitudinal portion 14 offset from the first portion 12 and a generally perpendicular leg portion 18. Optionally, the static seal portion 24 may extend axially along the first portion 12 and the offset portion 14 and such a configuration is known as a case with a "rubber OD". Further optionally, the case 10 does not have an offset portion 14 or a static seal portion 24 and is known as a case with a "metal OD"

The side of the seal lying to the right of the illustrated figures is known as the "oil side" or "sealed region", whereas the portion of the seal lying to the left of the figures is referred to as the "air side". Thus, when the seal 100 is assembled to the shaft 2 as shown in FIG. 2, the region shown as 6 is the enclosed or sealed region or the oil side, while the region shown as 8, lies outside the sealed region or the air side. If the case is a radial retainer, it is preferable to bond the primary seal ring 30 to the radial portion of the retainer. The retainer or L-shaped rigid case 10 may be made from steel, aluminum or plastic or any similar rigid material suitable for use in the application.

As shown in FIGS. 1, 2 and 3, the peripheral seal ring 30 has a spiral ridge 32 which is formed on the sealing surface 34 to pump any oil that migrates along the periphery 3 of the shaft 2 back towards the oil side 6. The seal surface 34 is in sealing contact with the wear surface 4 of the shaft 2. The seal ring 30 is preferably made from a lubricious material such as fluorocarbon polymeric resin material, known by those skilled in the art as "PTFE" and commercially available as Teflon® which is a trademark of DuPont. Alternatively, the PTFE may be made from Hostaflon® which is a trademark of Dyneon.

The seal ring 30 is chemically bonded to the elastomeric body portion 28 by conventional means. Optionally, the elastomeric body portion 28 does not extend toward the air side 8 of the case 10 and the sealing ring 30 is bonded directly to the rigid case 10 by conventional means. Still further optionally, the seal ring 30 is bonded directly to the rigid case 10 and an elastomeric body is molded to the inner surface of the first portion 12 and second portion 14 and extends radially inwardly toward the shaft to clamp the seal ring 30 to the case 10 and is known as the "clamped type".

The elastomer body portion 28 may be a thermoset polymer such as fluorocarbon, polyacrylate, nitrile, hydrogenated nitrile or silicone or the like elastomer or a suitable thermoplastic elastomer. Thus, preferably, the seal 100 has a composite body 40 made from a seal ring 30 and an elastomeric backing element 26 with a common inner diameter cylindrical surface 38. The elastomeric backing element portion 26 of the connecting body portion 28 extends from one end 36 to the other end 37 of the seal ring 30. The one end 36 of the seal ring 30 extends toward the air side 8. Optionally, the elastomeric backing element 26 may extend past the one end 36 of the seal ring 30 to form a static sealing element 29 which rubs against the wear surface 4 of the shaft 2 as shown in FIG. 4. Alternatively, a circumferential gap 31 may be formed between the one end 36 and the static sealing element 29 as shown in FIG. 5. The static sealing element 29 assists in excluding contaminants as well as providing a static seal against the shaft 2 during air leak testing.

Returning to FIGS. 2 and 3, the spiral ridge 32 in the sealing surface 34 is in the form of a helix that is oriented to pump fluid back towards the oil side 6. Thus, the helix captures any oil that migrates along the shaft 2 in a spiral ridge or groove 32. The spiral ridge 32 is oriented so as to move the oil back along the shaft 2 towards the sealed region 6. Optionally as shown in FIG. 6, the spiral ridge or groove 32 may be tapered 33 from a height 39 near the end 36 and the height or depth of the ridge decreases as the ridge approaches the oil side 6. Further optionally, the spiral ridge or groove 32 may be reverse tapered 35 from a height 39' near the end 36 and the height or depth of the ridge increases as the ridge approaches the oil side 6 as shown in FIG. 7. Still further optionally, the profile of the spiral ride or groove 32 may be symmetrical, asymmetrical with an acute angle facing toward the oil side 6, or a saw-toothed configuration, as is well known in the art. Those skilled in the art will recognize that the spiral ridges in the sealing surface 34 are designed to control the flow of fluid so that the fluid does not migrate past the end 36 and into the air side 8.

Figure 8:
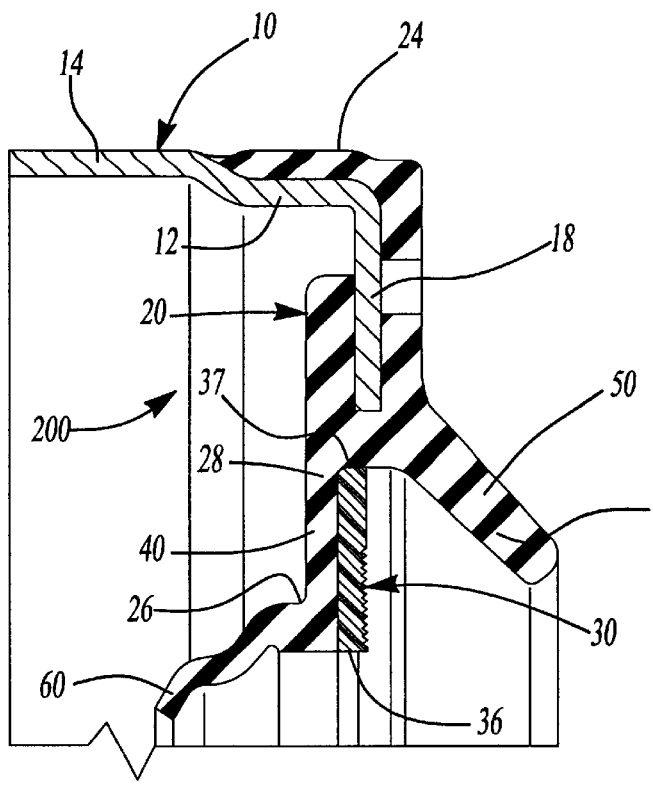
FIG. 8 is a partial cross-sectional view of the first alternate embodiment of the seal.
Figure 9:
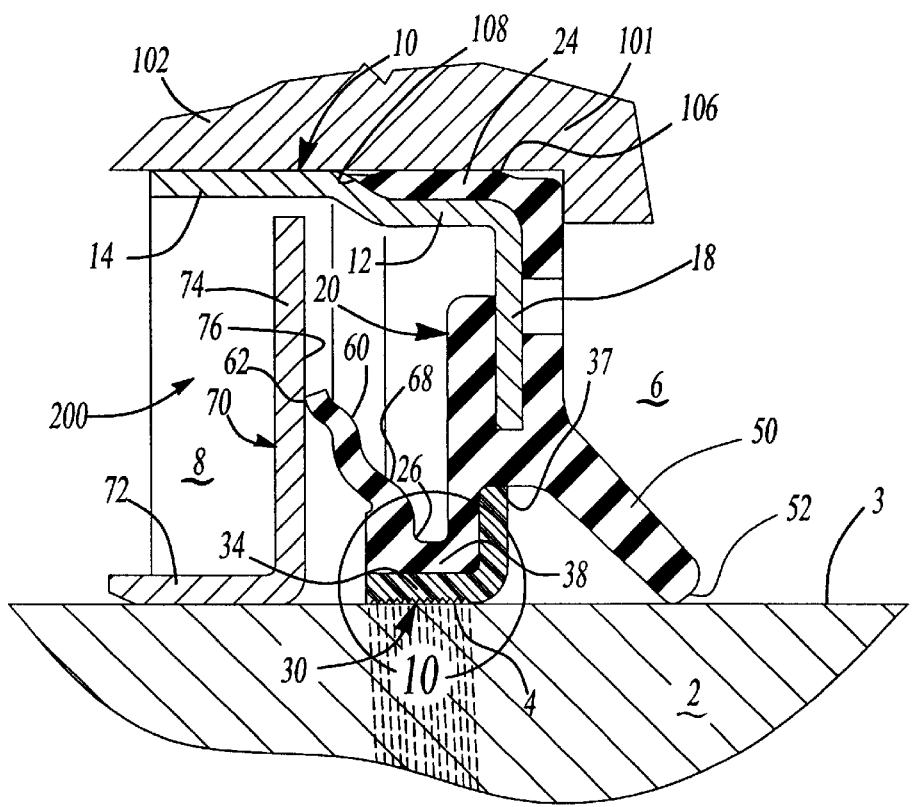
FIG. 9 is a partial cross-sectional view of the first alternate embodiment of the seal installed on a shaft.
Figure 10:
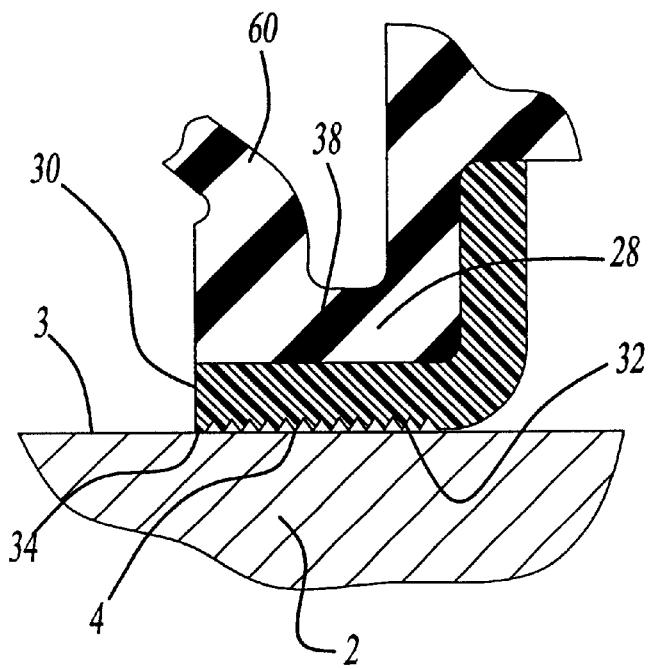
FIG. 10 is an enlarged view in circle 6 of FIG. 5.

FIGS. 8–10 show the first alternate embodiment of the radial shaft seal according to the present invention which is designated by the numeral 200. The seal 200 includes all of the elements described previously in the preferred embodiment of seal 100 which numerals remain the same, plus an oil side or internal excluder lip 50 that extends from the connecting body portion 28 of the seal body 20. The excluder lip 50 has an end or tip 52 that rubs against the wear surface 4 on the periphery 3 of the shaft 2. The excluder lip 50 initially functions to provide a static seal against the shaft 2 during the air pressure check phase of a powertrain or machine assembly plant quality procedure employed by equipment manufacturers. During the normal operation of the seal 200, the excluder lip 50 has a second function, that is, the end 52 rubs against the wear surface 4 on the periphery 3 of the shaft 2 to exclude or prevent oil contaminants from migrating along the shaft 2 towards the seal ring 30 and the interface between the seal surface 34 and the wear surface 4. Optionally, the internal excluder lip 50 may have helical ribs or spiral ridges formed on the portion contacting the shaft 2. Further optionally, the internal excluder lip 50 may be a non-contacting type, that is, the tip 52 does not rub against the wear surface but acts as a baffle to reduce the quantity of oil that migrates toward the seal ring 30 and is known as a "baffle type".

The first alternate embodiment of the radial shaft seal 200 also has a dust excluder 60 that extends toward the air side 8. The dust excluder 60 extends from the connecting body portion 28 or optionally, to the sealing body 20 to rub against the slinger member 70. The slinger member 70 is L-shaped and has an axially extending portion 72 which is mounted on the periphery 3 of the shaft 2 for rotation therewith. The slinger member 70 also has a radial extending portion 74 which extends from the shaft and has a wear surface 76. The tip 62 of the dust excluder 60 rubs against the wear surface 76 to prevent dirt or any other contaminant from migrating past it from the air side 8 of the seal and along the interface of the wear surface 4 and the seal surface 34. Exposing the seal ring 30 to contaminants such as dirt could cause premature wear or damage to the sealing surface of primary seal ring 30. The dust excluder 60 has a convoluted shape 68 to enhance the rubbing force of the tip 62 against the wear surface 76 and to apply additional bias to the elastomeric backing element portion 26 onto the seal ring 30 as shown in FIG. 9. The sealing surface 34 may optionally have a spiral ridge 32 as shown in FIGS. 8–10. Alternatively, the spiral ridge 32 may be tapered 33 as shown in FIG. 6 or reverse tapered 35 as shown in FIG. 7 or have optional spiral ridge profiles as discussed earlier. The sealing surface 34 controls the flow of fluid and prevents its migration into the air side 8. Those skilled in the art will recognize that the shape of the dirt excluder lip may take many configurations in order to optimize the design for the specific sealing application requirements, and its configuration is not limited to any one shape or configuration.

Figure 11:
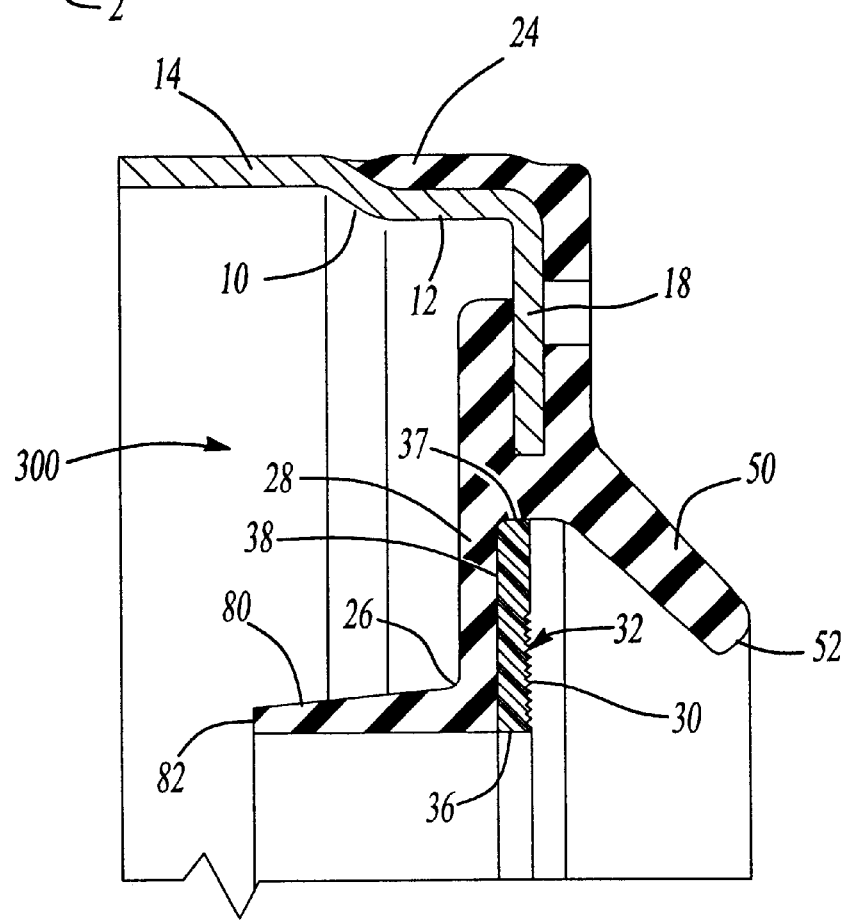
FIG. 11 is a partial cross-sectional view of the second alternate embodiment of the seal according to the present invention.
Figure 12:
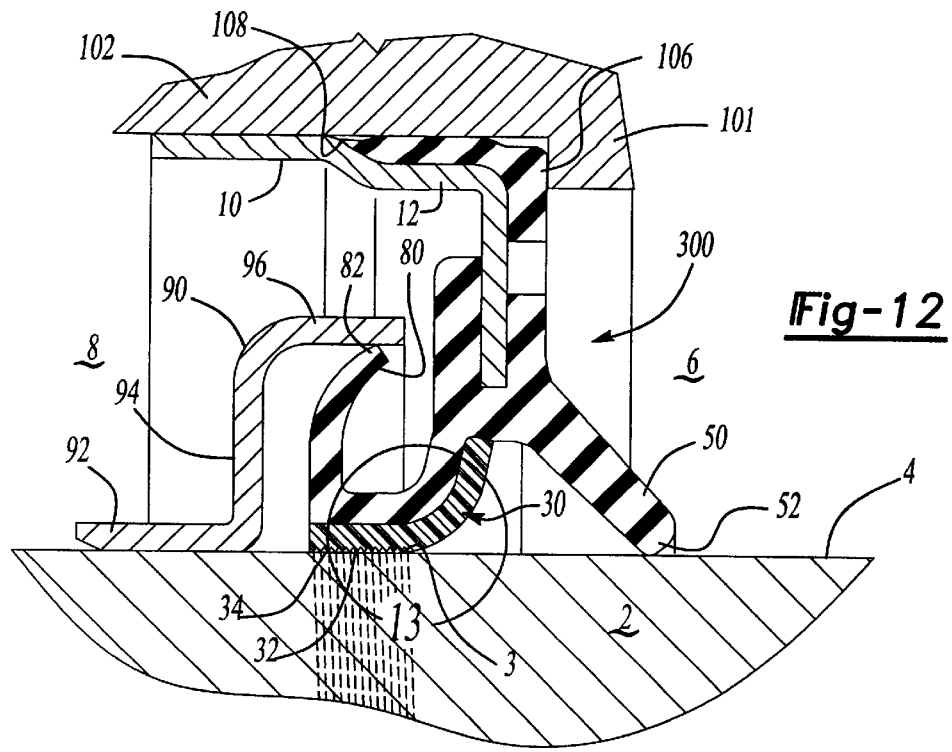
FIG. 12 is a partial cross-sectional view of the second alternate embodiment of th seal installed on a shaft.
Figure 13:
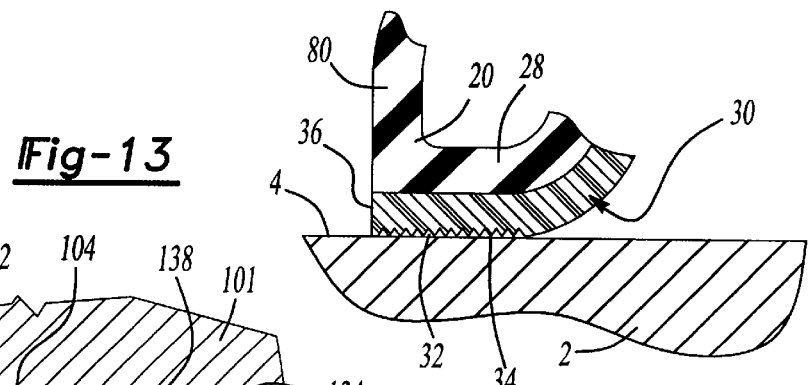
FIG. 13 is an enlarged view in circle 13 of FIG. 12.

The second alternate embodiment of the seal according to the present invention is designated by the numeral 300 and is shown in FIGS. 11, 12 and 13. The seal 300 includes all of the elements described in the first alternate embodiment of the seal 200 which numerals remain the same, plus a dirt or dust excluder 80. In this second alternate embodiment, the dust excluder 80 rubs up against an S-shaped slinger member 90. The slinger 90 has an axially extending portion 92 which is mounted on the periphery 3 of the shaft 2 for rotation therewith. The slinger 90 also has a radial portion 94 that extends from the axial portion 92. A longitudinal portion 96 extends from the radial portion 94 and extends parallel to the rotation of the shaft 2 toward the sealed region 6 but does not touch the seal body 20. The longitudinal portion 96 has a wear surface 98 that rubs against the lip 82 of the dust excluder 80. The shape of the dust excluder 80 may take on many configurations in order to meet the application requirements of the seal and is not limited to any one shape or configuration. For example, the excluder lip may extend axially and radially form the sealing body 20 as is similar to the excluder lip seal 114 shown in FIG. 14. In this configuration, the slinger in FIG. 12 could be designed to form an "S shape" with the lip 80 rubbing against the radial surface extending furthest from the shaft or, in another example, the slinger 90 could be extended radially further away from the shaft so that the excluder lip extending from the above described sealing body contacts the axially extending surface of the modified slinger. The dirt excluder 80 has a bias to extend radially from the shaft 2 but the wear surface 98 of the S-shaped slinger member 90 does not permit the radial dirt excluder 80 to extend to its full radial length. Thus, this design configuration creates a force which causes the tip 82 to rub against the wear surface 98. The elastomeric properties of the polymer also provide an additional bias to press the elastomeric backing portion 26 onto the seal ring 30 which causes the sealing surface 34 to rub against the wear surface 4, as shown in FIG. 13. Those skilled in the art will recognize that the sealing surface 34 may have a spiral ridge 32 and the ridge may be tapered 33, as shown in FIG. 6, or reverse tapered 35, as shown in FIG. 7, or have optional spiral ridge profiles, as discussed previously.

The shaft seals according to the present invention, described in the preferred, first, or second alternative embodiments, are installed in place within a machine assembly 101. As shown in FIGS. 2, 9, and 12, the machine assembly 101 includes a housing 102 or the like having an opening 104 through which extends a circular shaft 2 having a peripheral portion 3. A counter bore 106 is formed in the interior diameter opening in the housing 102. In the preferred, first, or second embodiments, the seal body 20 is installed onto the shaft 2 so that the one end 36 of the primary seal ring 30 extends away from the sealed region 6 and towards the air side region 8 which is outside the sealed region 6. The case 10 is inserted into the counter bore 106 so that the static seal portion 24 engages the surface 108 of the bore 104 of the housing 102 to prevent fluid migration past the one end 36 of the primary seal ring 30.

When using the first alternate embodiment which includes an oil side excluder 50 with the seal 200, prior to sliding the one end 36 onto the shaft 2, care must be taken to orient the tip 52 around the shaft 2 and toward the sealed region 6. After the primary seal ring 30 engages the shaft 2, the seal 100 is inserted into the counter bore 106 as described above in seal 100 of the preferred embodiment.

When using the slinger member 70 in conjunction with the seal 200, as shown in the first alternative embodiment as shown in FIG. 9, the member 70 is disposed on the shaft 2 and the slinger member 70 is moved axially along the shaft 2 toward the sealed region 6 until the tip 62 of the seal 200 engages the wear surface 76. The member 70 is then attached to the shaft 2. In all other aspects the operation of the first alternative embodiment is the same as seal 100 of the preferred embodiment.

Similarly, when the S-shaped slinger member 90 is used in conjunction with seal 300 and is mounted on shaft 2, as shown in FIG. 12 of the second alternative embodiment, the member 90 is disposed in the shaft 2 and moved axially along the shaft 2 toward the sealed region 6 until the tip 82 of the seal 300 engages the wear surface 98 of the S-shaped slinger 90. In all other aspects the operation of the second alternative embodiment seal 300 is the same as seal 200 of the first alternate embodiment.

The next two embodiments of a seal according to the present invention are seals which have two elements that after being assembled are "unitized" and held together for cooperative sealing and are called unitized seals. The unitized seal, as shown in the embodiments in FIGS. 14 and 16, has two major parts that rotate relative to each other. Both seals can be installed in place within the machine assembly 101 which includes a housing 102, with an opening 104 through which extends a rotary shaft 2 having a peripheral portion 3. A counter bore 106 forms the interior diameter opening in the housing 102. The specific details of the construction of both unitized seals are discussed in detail below. In these two embodiments, a primary seal is formed on one part and a wear sleeve surface is formed on the other part. The two parts are "unitized" or "assembled" together.

Figure 14:
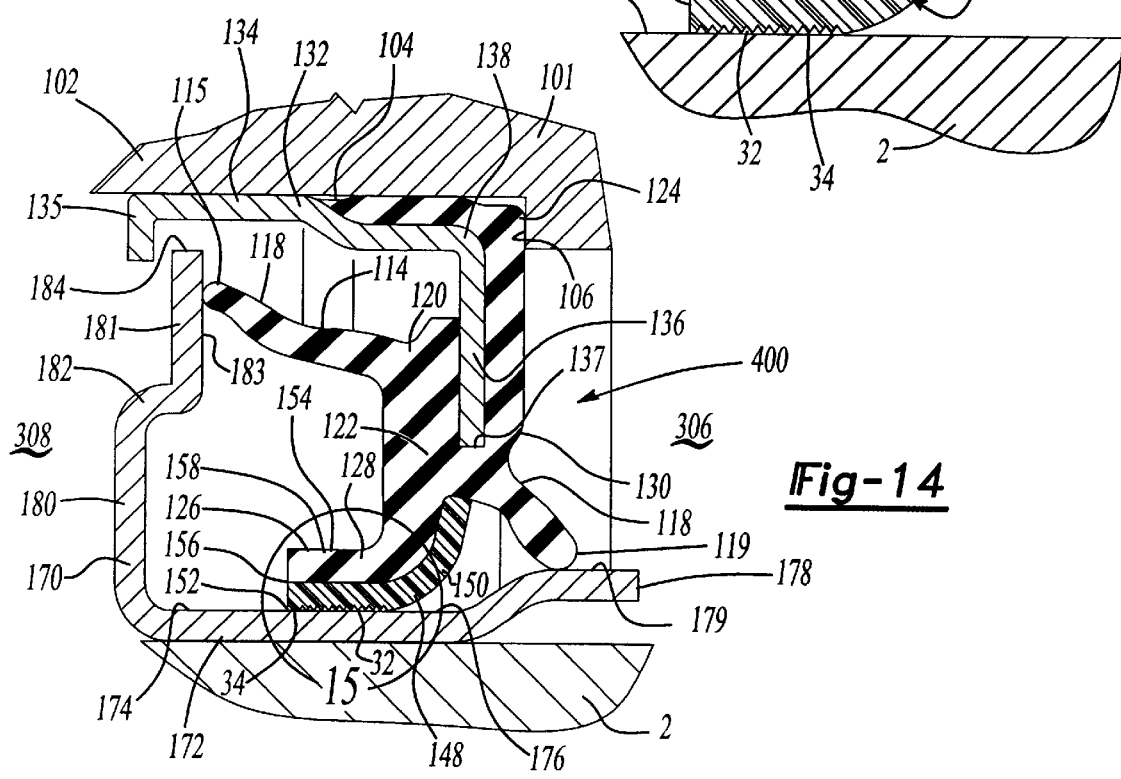
FIG. 14 is an cross-sectional view of the first embodiment of a unitized seal according to the present invention.
Figure 15:
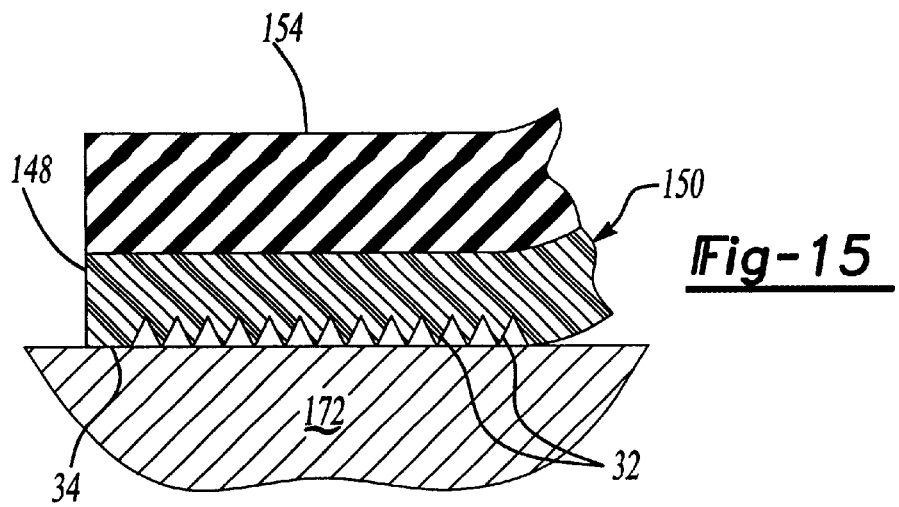
FIG. 15 is an enlarged view of the first embodiment of the unitized seal in circle 15 of FIG. 14.

Referring to FIGS. 14 and 15, the first embodiment of the unitized seal 400 is made according to the present invention which includes the elements previously described in the preferred embodiment of seal 100 which numerals remain the same. As stated earlier, the seal 400 has two major components. The first major component is a seal element generally designated by the numeral 130 and the second is a component that includes a one-piece unitizing casing generally designated by numeral 170.

The primary seal element 130 includes a one-piece primary seal case 132 having an axially extending, cylindrical mounting flange portion 134 and a radially inturned flange portion 136. Between the cylindrical portion 134 and the radial portion 136, there is an axially extending offset portion 138. At the end of the axially extending cylindrical mounting flange portion 134 is a radially inturned portion 136.

The "oil side" of the seal or the sealed region is designated by the numeral 306, whereas the "air side" or exterior region is designated by the numeral 308.

The primary seal element 130 also includes an elastomeric seal body 120, an intermediate or connecting body portion 122, a static seal portion 124 formed on the offset portion 138 of the case 132, and a primary seal element 150. The intermediate body portion 122 lies radially between static seal portion 124 and the primary seal element 150. The primary seal element 150 also includes a primary seal ring 148 which is made from a lubricious material such as PTFE as described previously. The primary seal ring 148 has a sealing band sleeve portion 152 that is chemically bonded to the elastomeric body 120 by conventional means. Thus, the primary seal element 150 forms a composite body 154 made from a fluorocarbon resin or PTFE sleeve portion element 152 or the like and an elastomeric backing element 128. Optionally, the primary seal ring 148 is bonded directly to the radial portion 136 of the case 132 and the elastomeric body portion does not extend toward the air side 38 similar to optional seal ring and case design configuration discussed in the preferred embodiment. The elastomer used in body 120 is a thermoset polymer which may be selected from fluorocarbon, polyacrylate, nitrile, hydrogenated nitrile, or silicone or the like elastomer or a suitable thermoplastic elastomer. The seal 150 includes the elastomeric ring portion 126 and the primary sealing ring 148. The ring portion 126 and seal ring 148 which are bonded together to form the composite body 154 and have a common interfacial surface 158. One end 156 of the composite body extends toward the air side 308 and away from the oil side 306. The seal ring 148 rubs against the wear surface 174 on the unitizing casing 170 and the seal ring 148 controls the flow of migrating fluid along the wear surface 174.

The connecting body portion 122 of the elastomeric seal body 120 is bonded to the end 137 of the radially inturned flange portion 136 of the primary seal case 132. The static seal portion 124 extends from the connecting body portion 122 and is bonded to the axially extending offset portion 138. The static seal portion 124 may optionally have at least one circumferential sealing rib molded thereon to provide a high line sealing force against the opening 104 to prevent leakage of fluid into the air side of the seal. Further optionally, the primary seal case may incorporate a "rubber OD" or a "metal OD" configuration as discussed in the preferred embodiment.

The elastomeric backing element 126 of the composite body 154 acts to provide a radial force on the primary sealing element 150 towards shaft 2. A spiral ridge or groove 32 is formed on the sealing surface 34 of the ring 148. The ridge or groove 32 is in the form of a helix that is oriented to pump the fluid back towards the oil side 306 as shown in FIG. 15. Optionally, the spiral ridge 32 may be tapered 33 as shown in FIG. 6 or reverse tapered 35 as shown in FIG. 7 or incorporate the spiral ridge profiles discussed earlier in the preferred embodiment. Thus, any oil or other material that migrates along the shaft toward the air side 308, will be trapped by the spiral ridge 32 and moved axially toward the sealed region 306. Optionally, the force applying elastomeric element 128 may extend past the one end of the seal ring 152 to form a static sealing element 159 which rubs against the wear surface 174 of unitizing case 170 as discussed earlier in the preferred embodiment. Alternatively, a circumferential gap may be formed between the one end of the sleeve 152 and the static sealing element. The static sealing element 159 assists in excluding contaminants as well as providing a static seal against the wear surface 174 during air leak testing so as to prevent fluid migration toward the air side of the seal. Further optionally, the element 126 may not extend on top of the sealing ring 152 and the element 150 is bonded directly to the case 132. Still further optionally, the seal ring 152 is of a "clamped type" as discussed in the preferred embodiment.

Returning to FIG. 14, the unitizing casing 170 is made from a rigid material such as steel or the like, and includes a central, generally cylindrical portion 172 that has an axially extending wear sleeve portion 174. The wear sleeve portion 174 has a properly finished wear surface 176, and at one end an offset portion 178 axially extending toward the oil side 306 with a properly finished wear surface 179, a radially extending portion 180 at the opposite end and a radially extending offset portion 181. A radially offset portion 182 connects portion 180 to portion 181 and has a properly finished wear surface 183 and terminates at the end 184.

The end 184 extends radially beyond the radially inturned portion 135 of the primary seal case 132. Those skilled in the art will recognize that as the primary seal element 130 is assembled to the unitizing case 170, the end 135 is folded radially to overlay the end 184 so as to form the unitized or complete seal assembly 400.

The elastomeric seal body 120 may optionally include an internal excluder lip seal 118 or an external excluder lip seal 114 or, optionally both seals 114,118, respectively, extending from the elastomeric seal body 120. Both seals 114,118, respectively, extend from the connecting body portion 122 of the elastomeric seal body 120. The internal excluder lip seal 118 preferably has an appendage that extends radially and has a tip 119 that rubs against the wear surface 179 of the offset portion 178. The internal excluder lip seal 118 prevents contaminants in the sealed region 306 from migrating along wear sleeve 174 toward the sealing ring 148. The internal excluder 118 protects the sealing ring 148 and increases its life. Optionally, the internal excluder lip may be a "baffle type" as discussed earlier. The external excluder lip seal 114 also extends from the seal body 120 and has a tip 115 that rubs against the wear surface 183 of the radially extending offset portion 184.

The external excluder lip seal 114 functions to prevent dirt, moisture, or other contaminants from migrating externally past it and along the wear sleeve 174 to the sealing ring 148. The external excluder lip 114 protects the primary sealing ring 148 from premature wear due to dirt contamination and increases its life. The sealing ring 148 preferably has a spiral ridge 32 but optionally it may be tapered 33, as shown in FIG. 6, or reverse tapered 35, as shown in FIG. 7, as described previously. Further optionally, the profile of the spiral ridge may be as previously described in the preferred embodiment. In all other aspects the seal 400 operates as the seal 100 described earlier.

Figure 16:
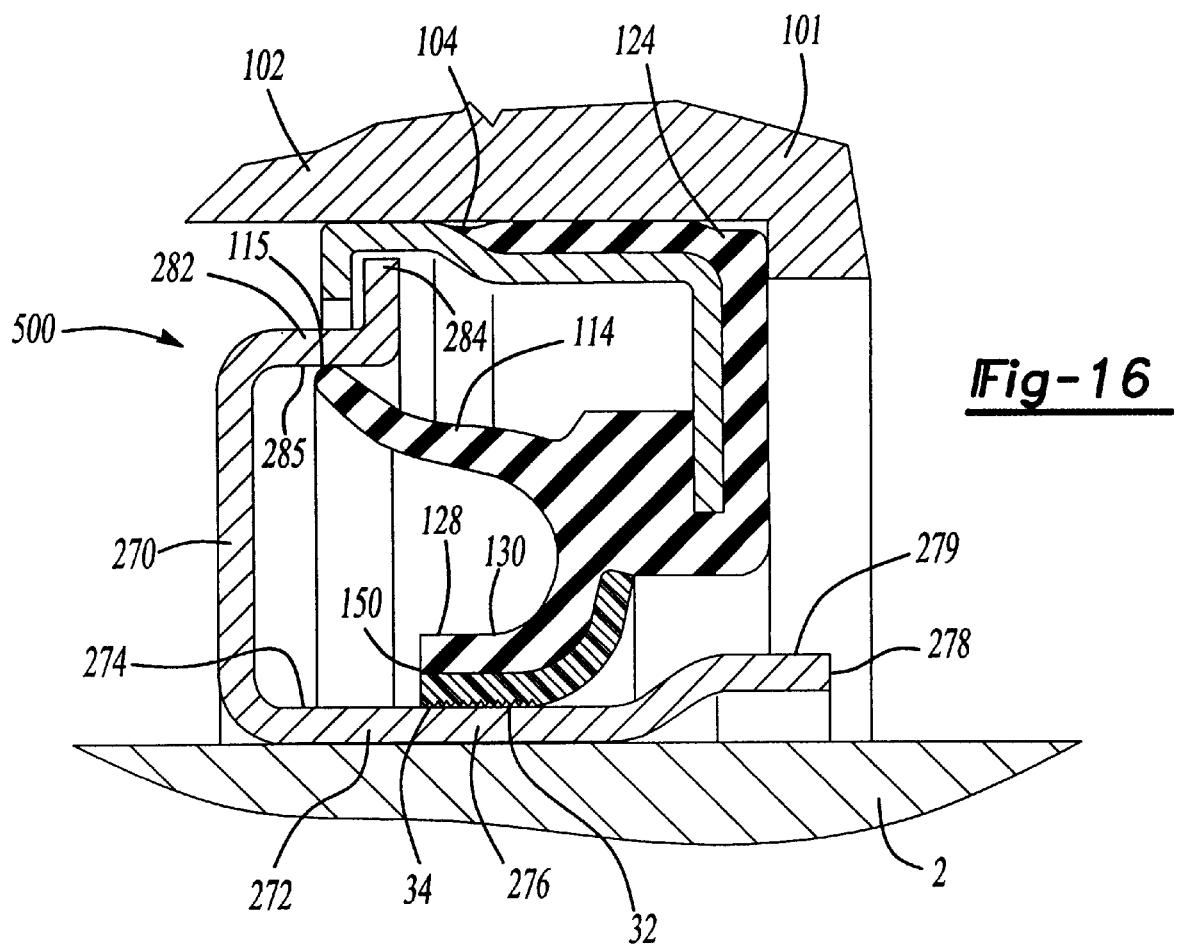
FIG. 16 is an enlarged view of an optional sealing groove of the unitized seal in circle 15 of FIG. 14.

A second embodiment of the unitized seal is shown in FIG. 16 and is designated with the numeral 500 which includes the elements previously described in seal 100 of the preferred embodiment and which numerals remain the same. The seal element 130 is the same as previously described in seal 400 except that the seal 500 does not have an internal excluder. A one-piece unitizing casing 270 has a central axially extending cylindrical portion 272, a wear sleeve portion 274 with a surface that has a properly finished wear surface 276, an axially extending offset portion 278 with a properly finished wear surface 279 at one end of the casing 270. The other end the casing 270 has a radially extending portion 280, and an axially extending portion 282 extending from the radial portion 280. The axially extending portion 282 is generally parallel to the wear sleeve portion 274 and terminates at an end 284 which extends radially away from the shaft 2. The axially extending portion 282 also has a wear surface 285 with a surface that is properly treated.

The tip 115 of an external excluder 114 rubs against the wear surface 285 of the axially extending portion 282. This configuration reduces the radial force exerted by the backing element onto the seal ring 150. The seal ring 150 has optionally a spiral ridge 32 formed in it and further optionally, the spiral ridge profiles described earlier. Those skilled in the art will recognize that the optional configurations shown in FIGS. 4 through 7 will find applicability to the seal 500 and operate in a like manner as seal 100. In all other aspects, the second embodiment of the unitized seal 500 operates like the seal 400.

Figure 17:
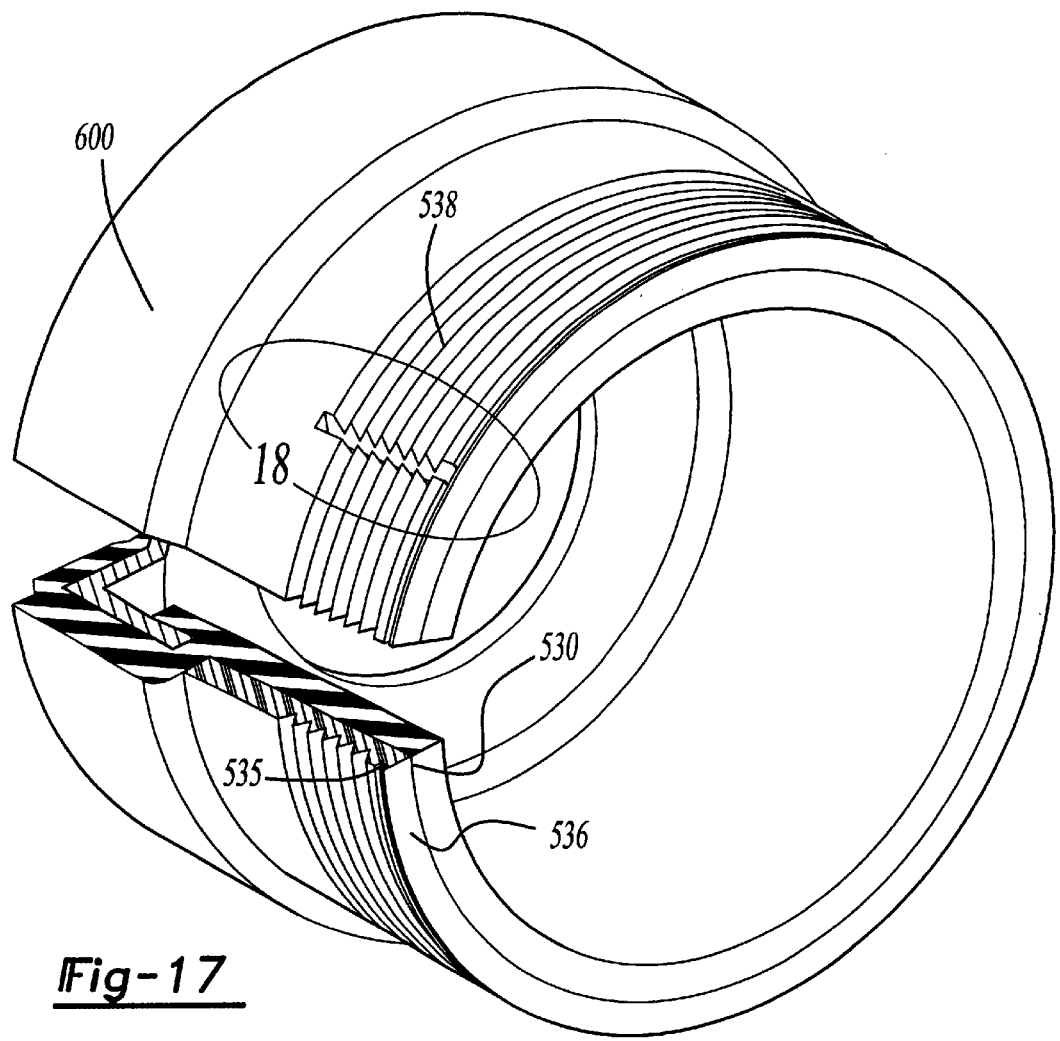
FIG. 17 is an enlarged partial sectional view of an optional relief groove in the seal ring.
Figure 18:
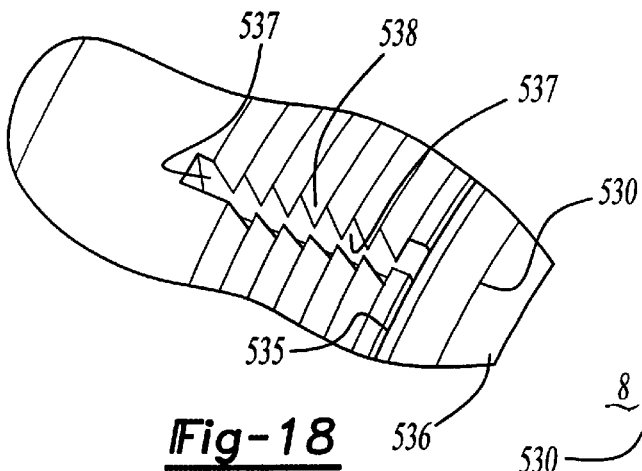
FIG. 18 is an enlarged partial cross-sectional view of the optional relief groove in Circle 18.
Figure 19:
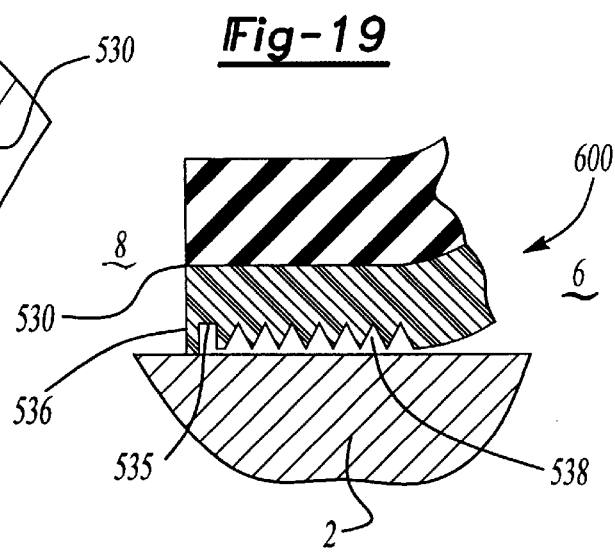
FIG. 19 is a partial perspective sectional view of the grooves in the third alternate embodiment of the seal according to the present invention.

A third alternate embodiment of the seal according to the present invention is shown in FIGS. 17, 18 and 19 and designated by the numeral 600. The third embodiment has application to the radial shaft seal embodiments designated by the numerals 100, 200 and 300, respectively, as well as the unitized seals 400 and 500, respectively. The third alternate embodiment seal 600 is utilized where the shaft 2 is run in both a clockwise rotational direction and in a counterclockwise direction. Normally, a seal is designed with a pumping feature which promotes the desired sealing action in only one direction of rotation, that is unidirectional. However, there are applications where the shaft may be occasionally run in the reverse direction. In the previous embodiments shown in FIGS. 1 through 16, because of the direction or the optional profiles described earlier of the spiral ridge 32 on the peripheral seal ring 530 of the seal, leakage may be promoted by the purging action of the spiral ridge or groove 32 when the shaft rotation is counter to the pumping direction of the spiral ridge, that is, reversed from the designed pumping direction. As shown in FIGS. 17–19, this problem is overcome with seal 600. Seal 600 includes a continuous circumferential groove 535 near the end 536 of the peripheral seal ring 530. The groove 535 provides a small reservoir in which any fluid may accumulate during periods of shaft rotation reversal. The groove 535 interrupts the axial flow of a fluid which migrates along the shaft 2 toward the air side 8 and provides a fluid reservoir to accumulate the fluid.

Alternatively, the seal 600 is provided with a relief groove 537 which extends axially across the spiral ridges or grooves 538, as shown in FIG. 18. The grooves 538 may be of uniform depth as shown in FIG. 3 or tapered in one direction as shown in FIG. 6 or reverse tapered in the other direction as shown in FIG. 7 or incorporate the optional spiral ridge profiles described earlier. Under normal operating conditions, that is when the shaft rotation and the spiral ridges 538 are in the proper orientation, the relief groove 537 does not affect the pumping performance of the seal 600. Any fluid or oil that migrates along the shaft 2 is trapped by the spiral ridges 538 and the oil moves back along the shaft toward the oil side 6 by the proper orientation of the spiral ridges 538. However, when the shaft rotation is reversed, the fluid or oil is moved by the spiral ridges 538 toward the air side 8. As the fluid migrates toward the air side 8, the fluid encounters greater resistance to flow and the relief groove 537 provides a flow path for the fluid so as to permit it to be pumped back toward the oil side 6. Preferably, the circumferential groove 535 and the relief groove 537 are combined to provide the greatest benefit to seal performance when the shaft rotation is reversed. The fluid reservoir provided by the groove 535 permits the accumulation of fluid along the shaft 2 and the spiral ridges 538 move the oil toward the air side until the reservoir is full and the relief groove 537 then permits the fluid, which is accumulated in the reservoir formed by the circumferential groove 535, to move along the relief groove 537 back toward the oil side 6.

A fourth alternate embodiment of the seal according to the invention is shown in FIGS. 20, 21 and 22 and designated by the numeral 700 which includes the elements previously described in the first embodiment and which elements are the same, the numerals remain the same. The fourth embodiment has application to the radial shaft seal embodiments designated by the numerals 100, 200 and 300 and the unitized seal 400, respectively.

The fourth alternate embodiment provides additional pumping capability to the oil side internal excluder lip 650 which extends radially from the static seal 24 of the seal body 620. The excluder lip 650 is axially longer than the dust excluder lip 60, described previously in the other embodiments, and has an end 652 which extends axially toward the oil side 6. The excluder lip 650 has helices 654 which are formed on a sealing surface 658. The surface 658 is in sealing contact with the wear surface 4 of the shaft 2. The helices 654 are formed on the sealing surface 656 so as to pump any oil or lubricating fluid that migrates along the periphery 4 of the shaft 2 back towards the oil side 6. Thus, dirt and lubricating fluid are prevented by the helices 654 formed on the sealing surface 656 from migrating along the periphery 3 of the shaft 2 towards the peripheral sealing ring 630. Optionally, a spiral ridge is formed on the sealing surface 656 and may incorporate the spiral ridge profiles discussed earlier or be a baffle-type configuration as discussed earlier.

The peripheral sealing ring 630 is similar to seal ring 30, previously described, except that the other end 637 extends radially along the leg portion 18 of the case 10 to extend the length of the seal ring 630 to the bonding portion 622 of the seal body 620 and the length of the seal ring 630 against the leg 18 of the case 10. Optionally, the seal ring 630 may be "clamped" to the case 10 as discussed earlier. The tip 62 of the dust excluder 60 rubs against the surface 76 of the slinger 70. In all other aspects the seal 700 is similar to the seal 200 of the first alternate embodiment.

Those skilled in the art will recognize that the excluder lip 650, the seal body 620 and peripheral seal ring 630 may be utilized in embodiments 200, 300 and 400 and the peripheral seal ring 630 and the seal body 620 may be used in embodiments 100 and 500.

While the invention has been described in connection with a preferred embodiment and several alternative embodiments, it will be understood that it is not intended to limit the invention to those embodiments only. On the contrary, it is intended to cover all alternative modifications and equivalents that may be included within the spirit and scope of the invention as defined by the appended claims.

What we claim is:

1. A shaft seal mounted on a rotatable shaft to prevent the migration of fluid from an oil side to an air side, said shaft seal comprising:

a case member; and a primary fluoropolymer seal ring attached to said case member, said primary seal ring having one end in sealing contact with the shaft, said one end extending toward the air side, said one end having a fluid control surface and at least one hydrodynamic groove in said fluid control surface, said hydrodynamic groove having tapered spiral formed ridges, said spiral ridges increasing in depth from said one end.

2. A shaft seal as claimed in claim 1 further comprising an elastomeric seal body adjacent said case member, said elastomeric seal body having an end portion, said end portion extending toward said air side, said end portion having a radial member extending over said one end of said primary seal ring so as to be in contact with the shaft.

3. A shaft seal as claimed in claim 2 further comprising:
   an internal excluder lip seal extending from said elastomeric member so as to be adjacent the shaft.

4. A shaft seal as claimed in claim 2 further comprising an external lip seal extending from said elastomeric seal body so as to bias said radial member of said end portion to contact the shaft.

5. A shaft seal as claimed in claim 2 wherein said end portion forming a gap between said one end and said radial member.

6. A shaft seal as claimed in claim 2 wherein said radial member of said end portion is in sealing contact with the shaft.

7. A shaft seal as claimed in claim 1 wherein said control surface includes a circumferential groove.

8. A shaft seal as claimed in claim 7 wherein a relief groove extends from said circumferential groove toward the oil side to permit fluid accumulated in said circumferential groove to be pumped back toward the oil side.

9. A shaft seal as claimed in claim 1 wherein said spiral formed ridges have a uniform groove depth.

10. A shaft seal as claimed in claim 1 wherein said control surface includes a relief groove extending across said tapered spiral formed ridges.

11. A shaft seal mounted on a rotatable shaft to prevent the migration of fluid from an oil side to an air side, said shaft seal comprising:
   a case member; and
   a primary fluoropolymer seal ring attached to said case member, said primary seal ring having one end in sealing contact with the shaft,
   said one end extending toward the air side,
   said one end having a contract surface engaging the shaft,
   said contact surface having a circumferential groove adjacent to said one end and a relief groove extending from said circumferential groove toward the oil side to permit fluid accumulated in said circumferential groove to move back toward the oil side.

* * * * *